(12) United States Patent
Ozawa et al.

(10) Patent No.: US 7,221,131 B2
(45) Date of Patent: May 22, 2007

(54) CONTROL CIRCUIT FOR DC-DC CONVERTER IN SEMICONDUCTOR INTEGRATED CIRCUIT DEVICE

(75) Inventors: Hidekiyo Ozawa, Kasugai (JP); Hidenobu Ito, Kasugai (JP); Chikara Tsuchiya, Kasugai (JP); Yasushige Ogawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 11/101,473

(22) Filed: Apr. 8, 2005

(65) Prior Publication Data

US 2006/0139820 A1    Jun. 29, 2006

(30) Foreign Application Priority Data

Dec. 28, 2004    (JP)    ............... 2004-379719

(51) Int. Cl.
 *G05F 1/00* (2006.01)
 *G11C 5/14* (2006.01)
 *H03K 5/08* (2006.01)

(52) U.S. Cl. ............... 323/272; 323/272; 323/282; 327/530; 327/547; 327/590

(58) Field of Classification Search ............... 323/272, 323/282; 327/530, 547, 590
 See application file for complete search history.

(56) References Cited

U.S. PATENT DOCUMENTS 6,469,483 B2 * 10/2002 Katayama ............... 323/282

6,603,671 B2 * 8/2003 Tokunaga et al. ............... 363/17
6,979,981 B2 * 12/2005 Yoshikawa ............... 323/225

FOREIGN PATENT DOCUMENTS

| JP | 08-223018 | 8/1996 |
|---|---|---|
| JP | 09-285109 | 10/1997 |
| JP | 10-031522 | 2/1998 |
| JP | 11-135728 | 5/1999 |

* cited by examiner

*Primary Examiner*—Evan Pert
(74) *Attorney, Agent, or Firm*—Arent Fox PLLC

(57) ABSTRACT

A DC-DC converter for generating power supply voltage differing from input voltage, while operating a semiconductor circuit at a predetermined speed regardless of differences between devices or changes in the operation environment. An output voltage control circuit compares an oscillation signal, which is provided from a ring oscillator of the semiconductor circuit, with a triangular wave signal, which is provided from an oscillator of the DC-DC converter, and changes the output voltage of the DC-DC converter in accordance with the comparison result. This substantially equalizes the oscillation signal of the ring oscillator with the triangular wave signal, which functions as a reference signal, and operates the semiconductor circuit at a speed that is in accordance with the triangular wave signal.

20 Claims, 7 Drawing Sheets

CONTROL CIRCUIT FOR DC-DC CONVERTER IN SEMICONDUCTOR INTEGRATED CIRCUIT DEVICE

CROSS-REFERENCE TO RELATED APPLICATIONS

This application is based upon and claims the benefit of priority from the prior Japanese Patent Application No. 2004-379719, filed on Dec. 28, 2004, the entire contents of which are incorporated herein by reference.

BACKGROUND OF THE INVENTION

The present invention relates to a semiconductor integrated circuit device, and more particularly, to a control circuit for a power supply circuit, such as a DC-DC converter, in a semiconductor integrated circuit device.

The operation speed of a semiconductor circuit varies depending on the operation environment or processing differences that occur during manufacturing. Thus, there is a demand for a power supply circuit that supplies a semiconductor circuit with the optimal power supply voltage.

In the prior art, progress has been made in increasing the speed and integration of semiconductor integrated circuit devices (LSI). Further, to meet the demand for semiconductor integrated circuit devices that consume less power, the operational power supply voltage has decreased. An electronic device is a combination of various types of semiconductor integrated circuit devices, and each semiconductor integrated circuit device is supplied with power supply voltage that is in accordance with its configuration. Each of the semiconductor integrated circuit devices includes semiconductor circuits. Due to process differences that occur when manufacturing a semiconductor integrated circuit device, the threshold voltage or resistance differs between the semiconductor circuits. This varies the operation speed of semiconductor circuits. Further, differences in the threshold voltage or resistance occur due to the temperature or power supply voltage. Accordingly, Japanese Laid-Open Patent Publication Nos. 10-31522, 11-135728, 9-285109, and 8-223018 each propose a technique for controlling the power supply voltage supplied to a semiconductor circuit (logic circuit) in accordance with the operational condition (e.g., delay time) of the semiconductor circuit.

Further, each semiconductor integrated circuit device of an electronic device is supplied with a different power supply voltage. It is thus preferable that a power supply circuit (e.g., DC-DC converter) be provided for each semiconductor integrated circuit.

SUMMARY OF THE INVENTION

The present invention provides a method for controlling a power supply circuit in a semiconductor integrated circuit device that operates a semiconductor circuit at a predetermined speed regardless of differences between devices or changes in the operational environment, while generating power supply voltage that differs from the input voltage.

One aspect of the present invention is a semiconductor integrated circuit provided with a semiconductor circuit including a monitor circuit for generating a monitor signal representing a characteristic of the semiconductor circuit. A power supply circuit connected to the semiconductor circuit supplies the semiconductor circuit with operational voltage. The power supply circuit includes an output circuit for generating the operational voltage. A signal generation circuit generates a reference signal. Either one of the semiconductor circuit and the power supply circuit includes a control circuit, connected to the monitor circuit and the signal generation circuit, for comparing the monitor signal and the reference signal to control the output circuit to change the operational voltage in accordance with the comparison result and to generate a control signal for selectively operating the monitor circuit.

Another aspect of the present invention is a semiconductor integrated circuit provided with a semiconductor circuit including a monitor circuit for generating a monitor signal representing a characteristic of the semiconductor circuit. A power supply circuit connected to the semiconductor circuit supplies the semiconductor circuit with operational voltage. The power supply circuit includes an output circuit for generating the operational voltage. A signal generation circuit generates a reference signal. Either one of the semiconductor circuit and the power supply circuit includes a first control circuit, connected to the monitor circuit and the signal generation circuit, for comparing the monitor signal and the reference signal to control the output circuit to change the operational voltage in accordance with the comparison result. A second control circuit connected to the monitor circuit generates a control signal to intermittently operate the monitor circuit.

A further aspect of the present invention is a semiconductor circuit for operation with voltage supplied from a DC-DC converter having a reference signal. The semiconductor circuit includes a monitor circuit, operated in accordance with a control signal, for generating a monitor signal representing a characteristic of the semiconductor circuit. A control circuit connected to the DC-DC converter and the monitor circuit compares the reference signal of the DC-DC converter and the monitor signal of the monitor circuit to control the DC-DC converter to change the voltage in accordance with the comparison result and to generate a control signal for selectively operating the monitor circuit.

Another aspect of the present invention is a semiconductor circuit for operation with voltage supplied from a DC-DC converter having a reference signal. The semiconductor circuit includes a monitor circuit, operated in accordance with a control signal, for generating a monitor signal representing a characteristic of the semiconductor circuit. A first control circuit connected to the DC-DC converter and the monitor circuit compares the reference signal of the DC-DC converter and the monitor signal of the monitor circuit to control the DC-DC converter to change the voltage in accordance with the comparison result. A second control circuit connected to the monitor circuit generates a control signal to intermittently operate the monitor circuit.

A further aspect of the present invention is a DC-DC converter for receiving input voltage and generating operational voltage for supply to a semiconductor circuit. The semiconductor circuit includes a monitor circuit for generating a monitor signal representing a characteristic of the semiconductor circuit. The DC-DC converter includes a signal generation circuit for generating a reference signal. A control circuit for connection to the monitor circuit and the signal generation circuit compares the monitor signal and the reference signal, controls the operational voltage in accordance with the comparison result, and generates a control signal for selectively operating the monitor circuit.

Another aspect of the present invention is a DC-DC converter for receiving input voltage and generating operational voltage for supply to a semiconductor circuit. The semiconductor circuit includes a monitor circuit for generating a monitor signal representing a characteristic of the semiconductor circuit. The DC-DC converter includes a signal generation circuit for generating a reference signal. A first control circuit for connection to the monitor circuit and the signal generation circuit compares the monitor signal and the reference signal to control the operational voltage in accordance with the comparison result. A second control circuit for connection to the monitor circuit generates a control signal to intermittently operate the monitor circuit.

A further aspect of the present invention is a circuit for controlling a DC-DC converter for receiving input voltage and generating operational voltage for supply to a semiconductor circuit. The semiconductor circuit includes a monitor circuit for generating a monitor signal representing a characteristic of the semiconductor circuit. The circuit includes a signal generation circuit for generating a reference signal. A control circuit connected to the monitor circuit and the signal generation circuit compares the monitor signal and the reference signal, controls the DC-DC converter to change the operational voltage in accordance with the comparison result, and generates a control signal for selectively operating the monitor circuit.

Another aspect of the present invention is a method for controlling a DC-DC converter that receives input voltage and generates operational voltage supplied to a semiconductor circuit. The semiconductor circuit includes a monitor circuit for generating a monitor signal representing a characteristic of the semiconductor circuit. The method includes generating a reference signal, comparing the monitor signal and the reference signal to control the DC-DC converter to change the operational voltage in accordance with the comparison result, and stopping the operation of the monitor circuit with a control signal.

A further aspect of the present invention is a method for controlling a DC-DC converter that receives input voltage and generates operational voltage supplied to a semiconductor circuit. The semiconductor circuit includes a monitor circuit for generating a monitor signal representing a characteristic of the semiconductor circuit. The method includes intermittently operating the monitor circuit with a control signal, generating a reference signal, and comparing the monitor signal and the reference signal to control the DC-DC converter to change the operational voltage in accordance with the comparison result.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
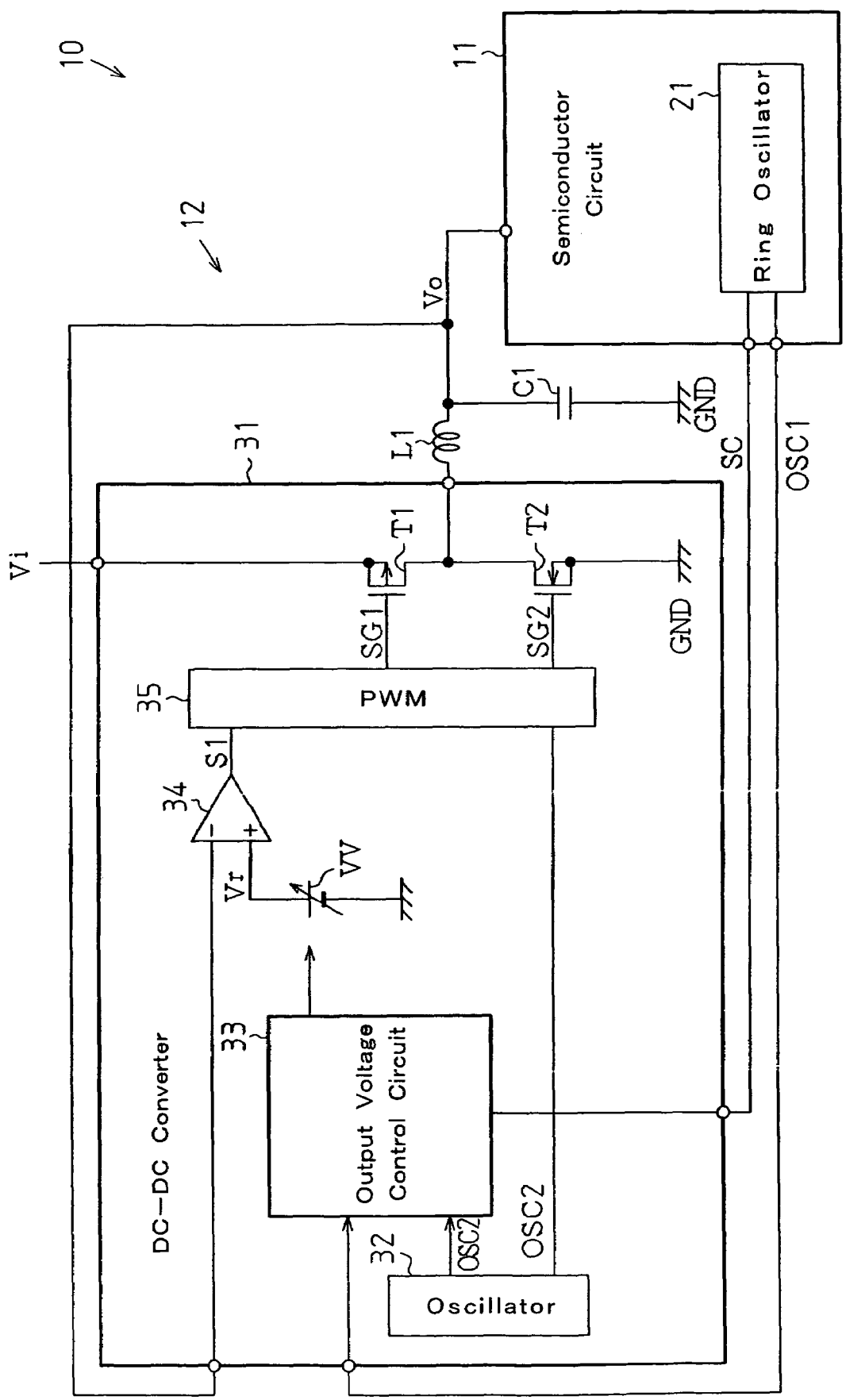
FIG. 1 is a schematic block diagram of a semiconductor integrated circuit device according to a preferred embodiment of the present invention.

A semiconductor integrated circuit device (hereinafter simply referred to as a semiconductor device) 10 according to a preferred embodiment of the present invention will now be described with reference to FIGS. 1 and 2.

The semiconductor device 10 includes a semiconductor circuit 11 and a power supply circuit (DC-DC converter) 12 for supplying the semiconductor circuit 11 with operational power supply voltage. The circuits 11 and 12 are integrated on the same chip. The semiconductor circuit 11 includes a logic circuit (not shown) and a ring oscillator 21, which are operated by power supply voltage Vo supplied from the DC-DC converter 12. The ring oscillator 21 is used as a means for detecting changes in the threshold value and resistance value caused by changes in the temperature or by process differences that occur when manufacturing the semiconductor circuit 11. The semiconductor circuit may include a logic circuit operated by using an oscillation signal OSC1 of the ring oscillator 21 as a clock signal. Alternatively, the semiconductor circuit may entirely be operated in accordance with a clock signal.

Figure 2:
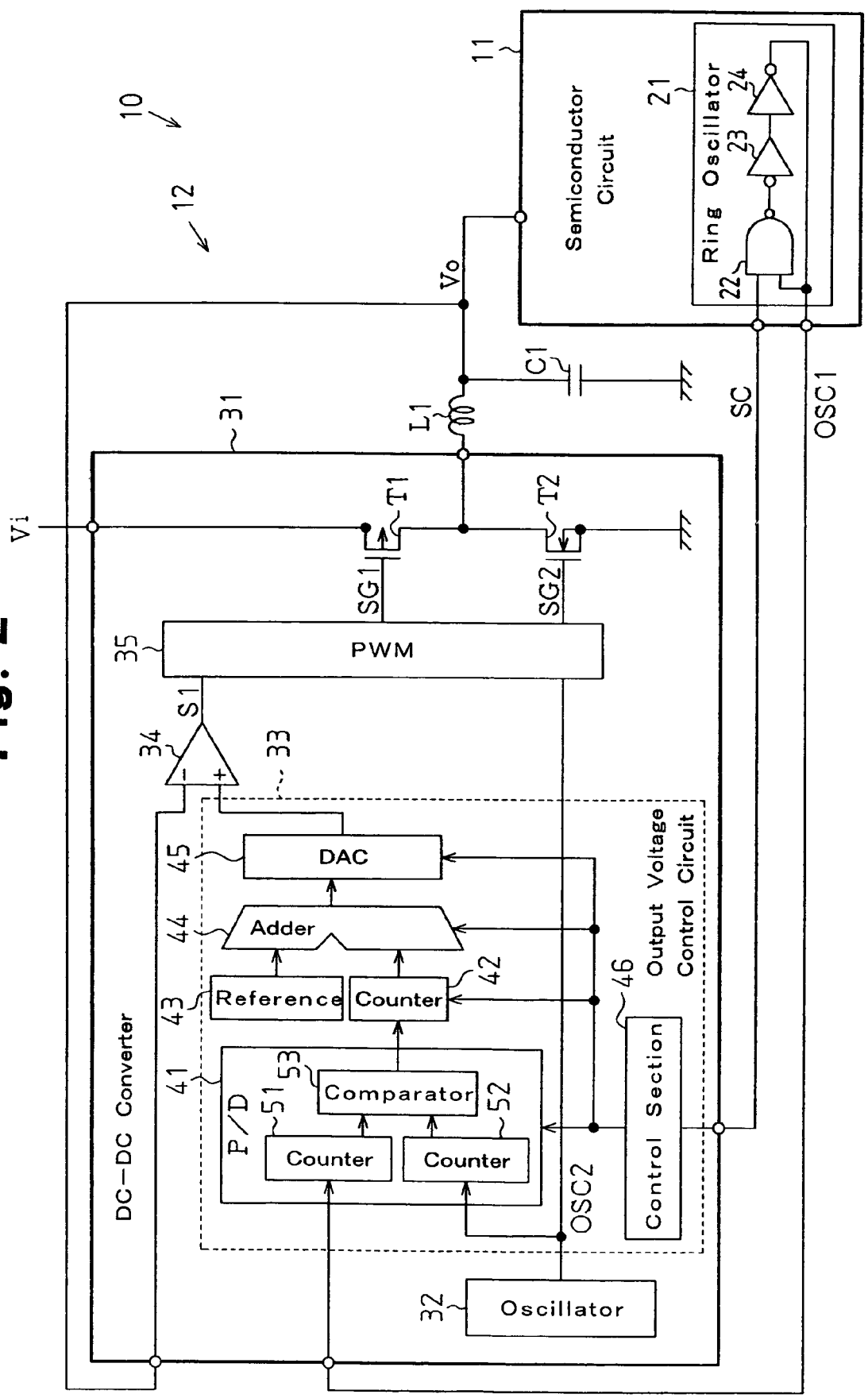
FIG. 2 is a detailed schematic block diagram of the semiconductor integrated circuit device of FIG. 1.

Referring to FIG. 2, the ring oscillator 21 includes a NAND circuit 22, which functions as an inverting device, and two inverter circuits 23 and 24. The ring oscillator 21 may include an odd number of the NAND circuits 22. The NAND circuit 22 includes a first input terminal for receiving a control signal SC, a second input terminal for receiving the oscillation signal OSC1, and an output terminal connected to the first inverter circuit 23. The first and second inverter circuits 23 and 24 are connected in series, and the output terminal of the second inverter circuit 24 is connected to the second input terminal of the NAND circuit 22. Although not shown in FIG. 2, the NAND circuit 22 and the inverter circuits 23 and 24 include a high potential power supply terminal for receiving the voltage Vo and a low potential power supply terminal connected to the ground GND. The ring oscillator 21 oscillates when the control signal SC is high and stops oscillating when the control signal SC is low.

Referring to FIG. 1, the DC-DC converter 12 is a stepdown type DC-DC converter 12 that receives input voltage Vi and generates the voltage Vo, which is lower than the input voltage Vi. The DC-DC converter 12 generates the control signal SC to control the oscillation of the DC-DC converter 12. Further, the DC-DC converter 12 adjusts the output voltage Vo so that the oscillation frequency of the ring oscillator 21 is set at a desired frequency based on the oscillation signal OSC1 of the ring oscillator 12.

The DC-DC converter 12 includes a control circuit 31, a coil L1, and a capacitor C1. The coil L1 and capacitor C1 are connected to the control circuit 31. The control circuit 31 includes an oscillator 32, an output voltage control circuit 33, an error amplification circuit 34, a PWM control circuit 35, a first transistor T1, a second transistor T2, and a variable power supply VV.

The oscillator 32 is a triangular wave oscillator, which generates a triangular wave signal OSC2 having a predetermined frequency. The triangular wave signal OSC2 is provided to an output voltage control circuit 33 and a PWM control circuit 35.

The output voltage control circuit 33 generates the control signal SC at a high level during a predetermined period that is set to perform, for example, initialization when activated. Then, the output voltage control circuit 33 generates the control signal SC at a low level. The ring oscillator 21 of the semiconductor circuit 11 oscillates during the predetermined period in response to the high control signal SC and then stops oscillating in response to the low control signal SC. Accordingly, the increase in the power consumption of the semiconductor circuit 11 due to the ring oscillator 21 is limited to the predetermined period.

The power consumption of the ring oscillator 21 is expressed by the equation shown below.

$$PW = (1/2) \times F \times C \times V \times V$$

In the equation, C represents the entire gate capacitance of the CMOS circuit configuring the NAND circuit 22 and the inverter circuits 23 and 24, F represents the oscillation frequency, and V represents the power supply voltage of the ring oscillator 21. If the ring oscillator 21 were to be constantly oscillated, the above power would be consumed. However, the control signal SC controls the oscillation of the ring oscillator 21. Thus, power consumption may be reduced by oscillating the ring oscillator 21 only when monitoring the operation condition of the semiconductor circuit 11.

The output voltage control circuit 33 receives the triangular wave signal OSC2 and the oscillation signal OSC1 of the ring oscillator 21, detects the frequency difference or phase difference between the triangular wave signal OSC2 and the oscillation signal OSC1, and controls the variable power supply VV in accordance with the detection result. The variable power supply VV supplies the error amplification circuit 34 with a comparison voltage Vr. Accordingly, the output voltage control circuit 33 controls the comparison voltage Vr, which is supplied to the error amplification circuit 34.

The error amplification circuit 34 includes a non-inverting input terminal, which receives the comparison voltage Vr, and an inverting input terminal, which receives the output voltage Vo. The error amplification circuit 34 amplifies the voltage difference between the comparison voltage Vr and the output voltage Vo to generate an amplified signal S1. The PWM control circuit 35 compares the voltage of the amplified signal S1 from the error amplification circuit 34 and the triangular wave signal OSC2 to generate first and second control signals SG1 and SG2 having a pulse width corresponding to the comparison result.

The first transistor T1 is a p-channel MOS transistor including a source for receiving the input voltage Vi, a drain connected to the second transistor T2, and a gate for receiving the first control signal SG1. The second transistor T2 is an n-channel MOS transistor including a source connected to a low potential power supply (in the preferred embodiment, the ground GND), a drain connected to the first transistor T1, and a gate for receiving the second control signal SG2. A node between the first transistor T1 and the second transistor T2 is connected to a first terminal of the choke coil L1, and a second terminal of the coil L1 is connected to the semiconductor circuit 11. The second terminal of the coil L1 is also connected to the ground GND via the smoothing capacitor C1.

The first transistor T1 and the second transistor T2 are activated and inactivated in a substantially complementary manner by the first control signal SG1 and the second control signal SG2. The activation and inactivation of the transistors T1 and T2 supplies the semiconductor circuit 11 with the output voltage Vo, which is generated by lowering the input voltage Vi. The output voltage Vo is determined by the ON/OFF ratio of the transistors T1 and T2 that is in accordance with the comparison result of the triangular wave signal OSC2 and the amplified signal S1, which is the voltage difference between the output voltage Vo and the comparison voltage Vr. That is, the DC-DC converter 12 feeds back the detection result of the output voltage Vo to control (PWM control) the pulse width of the first control signal SG1 and second control signal SG2, which are generated by the PWM control circuit 35. This controls the ratio of the activation time and inactivation time of the transistor T1 (ON/OFF ratio) to control the output voltage Vo.

The output voltage control circuit 33 controls the comparison voltage Vr based on the difference between the frequency of the oscillation signal OSC1 of the ring oscillator 21 and the frequency of the triangular wave signal OSC2 of the oscillator 32. Accordingly, the output voltage control circuit 33 controls the comparison voltage Vr to control the output voltage Vo and equalizes the frequency of the oscillation signal OSC1 with the frequency of the triangular wave signal OSC2. In other words, the output voltage control circuit 33 fixes the operation speed of the semiconductor circuit 11.

As shown in FIG. 2, the output voltage control circuit 33 includes a phase detector (P/D) 41, a counter 42, a register 43, an adder 44, a D-A converter (DAC) 45, and a control section (control circuit) 46.

The phase detector 41 detects the phase difference between the triangular wave signal OSC2 and the oscillation signal OSC1 to generate a comparison signal, which represents the detection result. In the preferred embodiment, the phase detector 41 detects the phase difference based on frequencies, which have a corresponding relationship with phases. That is, the phase detector 41 determines or counts the frequency (pulse number) of the triangular wave signal OSC2 and the frequency (pulse number) of the oscillation signal OSC1 to generate a phase comparison signal that is in accordance with the comparison result of the two count values. More specifically, the phase detector 41 includes a first counter 51, a second counter 52, and a comparator 53. The first counter 51 determines or counts the frequency (pulse number) of the oscillation signal OSC1 to generate a count value. The second counter 52 determines or counts the frequency of the triangular wave signal OSC2 to generate a count value. The comparator 53 compares the count values of the first and second counters 51 and 52 to generate the phase comparison signal in accordance with the comparison result.

The counter 42 is a count up/count down counter that counts upward or downward in accordance with the phase comparison signal S1 to generate the count value. The counter 42 has an initial value of zero (0). The count value of the counter 42 changes in accordance with the phase difference (frequency difference) between the oscillation signal OSC1 and the triangular wave signal OSC2. For example, when the frequency of the oscillation signal OSC1 is greater than the frequency of the triangular wave signal OSC2, the counter 42 generates a negative count value.

When the frequency of the oscillation signal OSC1 is not greater than the frequency of the triangular wave signal OSC2, the counter 42 generates a positive count value.

The reference voltage register 43 stores a reference voltage value of the output voltage Vo. For example, when the output voltage Vo is 3 volts (V), the reference voltage value is a digital value corresponding to the 3V.

The adder 44 adds the output count value of the counter 42 to the reference value read from the register 43 and provides the sum (digital value) to the DAC 45. The DAC 45 generates the comparison voltage Vr in accordance with the digital value provided from the adder 44. Accordingly, the DAC 45 functions as the variable power supply VV.

The control section 46 controls the operation of each of the circuits 41 to 45 in configuring the output voltage control circuit 33 and controls the ring oscillator 21 with the control signal SC. More specifically, the control section 46 generates the control signal SC at a high level for the ring oscillator 21 when detecting the condition of the semiconductor circuit 11 (e.g., during initialization) and controls the circuits 41 to 45. Accordingly, the ring oscillator 21 oscillates in response to the high control signal SC. Further, the output voltage control section 46 controls the comparison voltage Vr and the output voltage Vo so that the frequency of the oscillation signal OSC1 of the ring oscillator 21 and the frequency of the triangular wave signal OSC2 are substantially equalized. After the detection ends, the control section 46 generates the control signal SC at a low level, and the ring oscillator 21 stops oscillating in response to the low control signal SC. Further, the control section 46 stops the operation of the phase detector 41. As a result, the counter 42 does not change the count value and holds the final count value. The DAC 45 continuously generates the comparison voltage Vr in accordance with the finally held count value.

The operation of the semiconductor device 10 will now be described.

When the DC-DC converter 12 is activated, the count value of the counter 42 is set to 0. The adder 44 adds the count value to the reference voltage value stored in the register 43. Accordingly, the DAC 45 generates the comparison voltage Vr, which corresponds to the reference voltage value. As a result, the DC-DC converter 12 generates the output voltage Vo, which is determined by the reference voltage value.

Then, the control section 46 generates the control signal SC at a high level and operates the ring oscillator 21 to monitor the characteristic of the semiconductor circuit 11. After the ring oscillator 21 operates, the control section 46 operates the phase detector 41 and the counter 42. The frequency of the triangular wave signal OSC2 of the oscillator 32 and the frequency of the ring oscillator 21 are determined or counted. For example, when the count value of the counter 52 reaches a predetermined value n, the counters 51 and 52 of the phase detector 41 stops counting, and the comparator compares the count values of the counters 51 and 52.

For example, when the count value m of the counter 51 representing the frequency of the ring oscillator 21 is smaller than the count value n of the counter 52 representing the frequency of the triangular wave signal OSC2, the operation speed of the semiconductor circuit 11 is lower than the expected value. Thus, the count value of the counter 42 is increased to increase the output voltage Vo of the DC-DC converter 12. The adder 44 adds the count value of the counter 42 to the reference voltage value and provides the sum to the DAC 45. Accordingly, the comparison voltage Vr supplied to the error amplification circuit 34 is greater than the initial voltage value by voltage value α, which corresponds to the count value of the counter 42. As a result, the output voltage Vo of the DC-DC converter 12 is also increased by voltage value α. The increase in the power supply voltage Vo of the semiconductor circuit 11 increases the frequency of the ring oscillator 21. The control section 46 then operates the counters 51 and 52 of the phase detector 41 again, determines or counts the frequency of the triangular wave signal OSC2 and the frequency of the oscillation signal OSC1, and compares the two frequencies based on the count values.

When the count value m of the counter 51 representing the frequency of the ring oscillator 21 is greater than the count value n of the counter 52 representing the frequency of the triangular wave signal OSC2, the operation speed of the semiconductor circuit 11 is higher than the expected value. Thus, the count value of the counter 42 is decreased to decrease the output voltage Vo of the DC-DC converter 12. Accordingly, the comparison voltage Vr supplied to the error amplification circuit 34 is less than the initial voltage value by voltage value α, which corresponds to the count value of the counter 42. As a result, the output voltage Vo of the DC-DC converter 12 is also decreased by voltage value α. The decrease in the power supply voltage Vo of the semiconductor circuit 11 decreases the frequency of the ring oscillator 21. The control section 46 then operates the counters 51 and 52 of the phase detector 41 again, counts the frequency of the triangular wave signal OSC2 and the frequency of the oscillation signal OSC1, and compares the two frequencies based on the count values.

The control section 46 repeats the above operation and decreases the difference between the oscillation signal OSC of the ring oscillator 21 and the frequency of the triangular wave signal OSC2 of the oscillator 32. When the difference becomes substantially zero, the control signal generates a low control signal and stops the ring oscillator 21. Further, the control section 46 stops the operation of the phase comparator 53. The counter 42 holds the final count value at which the phase comparator 53 stopped operating. Thus, the DC-DC converter 12 continues to generate the comparison voltage Vr in accordance with the final count value.

By stopping the operation of the phase comparator 53, the power consumption is prevented from increasing. Further, the operation condition of the counter 42 and the comparator 53 do not change (the output value is held). Thus, the power consumption is low in comparison to when the operation state changes. As a result, the power consumption is low in comparison to when detecting the condition of the semiconductor circuit 11. That is, the entire power consumption of the semiconductor integrated circuit device 10 subtly increases compared to a device that does not incorporate the ring oscillator 21 or the output voltage control circuit 33. Further, the ring oscillator 21 and the output voltage control circuit 33 occupy a relatively small area. This prevents the circuit area of the semiconductor integrated circuit device 10 from being enlarged.

The semiconductor device 10 of the preferred embodiment has the advantages described below.

(1) The output voltage control circuit 33 compares the oscillation signal OSC1 provided from the ring oscillator 21 of the semiconductor circuit 11 with the triangular wave signal OSC2 provided from the oscillator 32 in the DC-DC converter 12 and changes the comparison voltage Vr based on the comparison result to change the output voltage Vo. As a result, the oscillation signal OSC1 of the ring oscillator 21 is substantially equalized with the triangular wave signal OSC2, which is a reference signal. Thus, the semiconductor circuit 11 operates at a speed that is in accordance with the triangular wave signal OSC2 (compensates for the characteristic of the semiconductor circuit 11) and stably operates at that speed.

(2) The output voltage control circuit 33 selectively operates the ring oscillator 21 with the control signal SC. As a result, the ring oscillator 21 may be operated to monitor the characteristic of the semiconductor circuit 11 only when necessary. This prevents an increase in the power consumption.

(3) The operation of the semiconductor circuit 11 is easily monitored by monitoring the characteristic of the semiconductor circuit 11 with the ring oscillator 21. Further, the employment of the ring oscillator 21 facilitates the control of the oscillation.

It should be apparent to those skilled in the art that the present invention may be embodied in many other specific forms without departing from the spirit or scope of the invention. Particularly, it should be understood that the present invention may be embodied in the following forms.

The present invention may be modified as shown in FIGS. 3 to 10.

Figure 3:
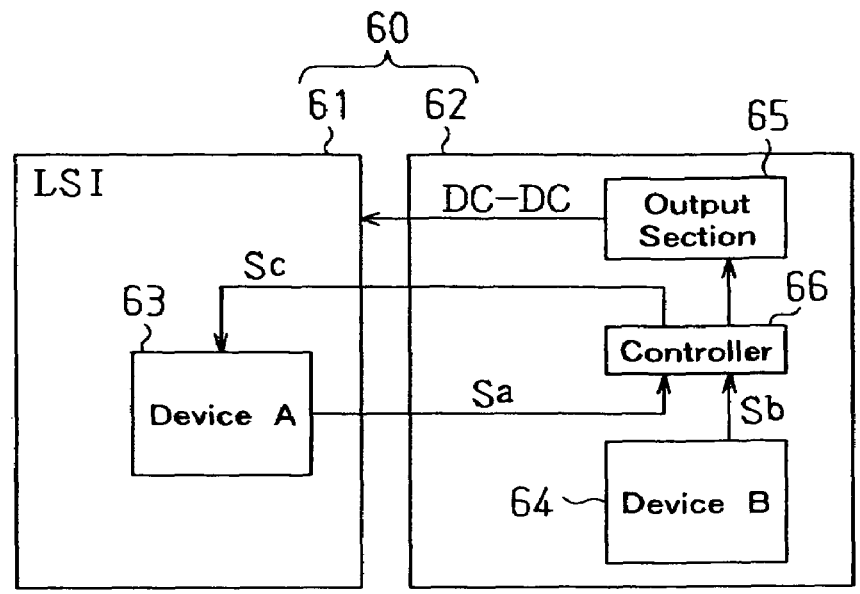
FIG. 3 is a schematic block diagram of a first modification of the semiconductor integrated circuit device.

Referring to FIG. 3, a semiconductor integrated circuit device 60 includes a semiconductor circuit (LSI) 61 and a DC-DC converter 62. The semiconductor circuit 61 includes a monitor circuit (device A) 63. The DC-DC converter 62 includes a signal generation circuit (device B) 64, an output section (output section) 65, and a controller 66.

The monitor circuit 63 monitors the characteristic of the semiconductor circuit 61 and corresponds to the ring oscillator 21 of the preferred embodiment. The signal generation circuit 64 generates a reference signal Sb and corresponds to the oscillator 32 of FIG. 1. The output section 65 generates operation voltage Vo for the semiconductor circuit 61 and corresponds to the transistors T1 and T2, the error amplification circuit 34, and the PWM control circuit 35 shown in FIG. 1. The controller 66 generates a control signal Sc, which controls the operation of the monitor circuit 63 based on the output signal Sa of the monitor circuit 63 and the reference signal Sb of the signal generation circuit 64, and controls the output section 65. The controller 66 corresponds to the output voltage control circuit 33. The monitor signal Sa corresponds to the oscillation signal OSC1 of the ring oscillator 21. The reference signal Sb corresponds to the triangular wave signal OSC2 of the oscillator 32. The semiconductor integrated circuit device may be configured by such functional blocks.

Figure 4:
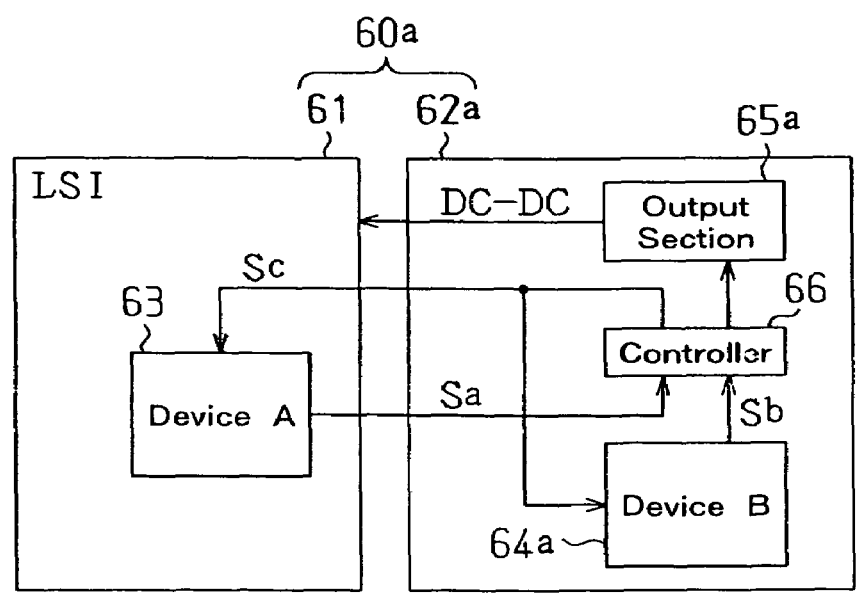
FIG. 4 is a schematic block diagram of a second modification of the semiconductor integrated circuit device.

Referring to FIG. 4, a semiconductor integrated circuit device 60a includes a semiconductor circuit (LSI) 61 and a DC-DC converter 62a. The DC-DC converter 62a includes a signal generation circuit (device B) 64a, an output section (output circuit) 65a, and a controller 66. The signal generation circuit 64a is selectively operated in response to a control signal Sc from the controller 66. Due to this configuration, the signal generation circuit 64a stops operating when monitoring is not being performed. This prevents an increase in the power consumption of the DC-DC converter 62a. In this example, the output section 65a includes the oscillator 32 of FIG. 1. Further, another oscillator that functions as the signal generation circuit 64a is necessary.

Figure 5:
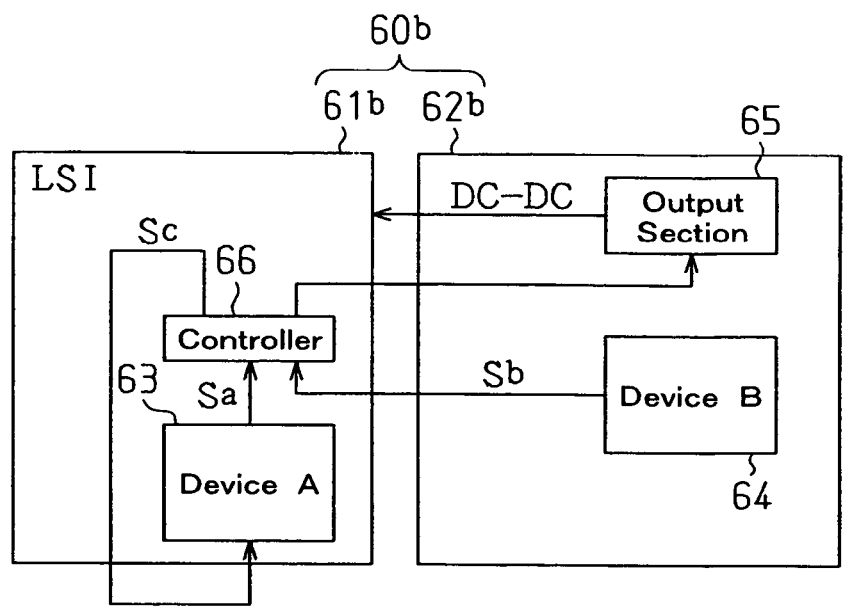
FIG. 5 is a schematic block diagram of a third modification of the semiconductor integrated circuit device.

Referring to FIG. 5, a semiconductor integrated circuit device 60b includes a semiconductor circuit (LSI) 61b and a DC-DC converter 62b. The semiconductor circuit 61b includes a monitor circuit (device A) 63 and a controller 66. The DC-DC converter 62b includes a signal generation circuit (device B) 64 and an output section (output circuit) 65. In this example, the controller 66 is not limited to a DC-DC converter.

Figure 6:
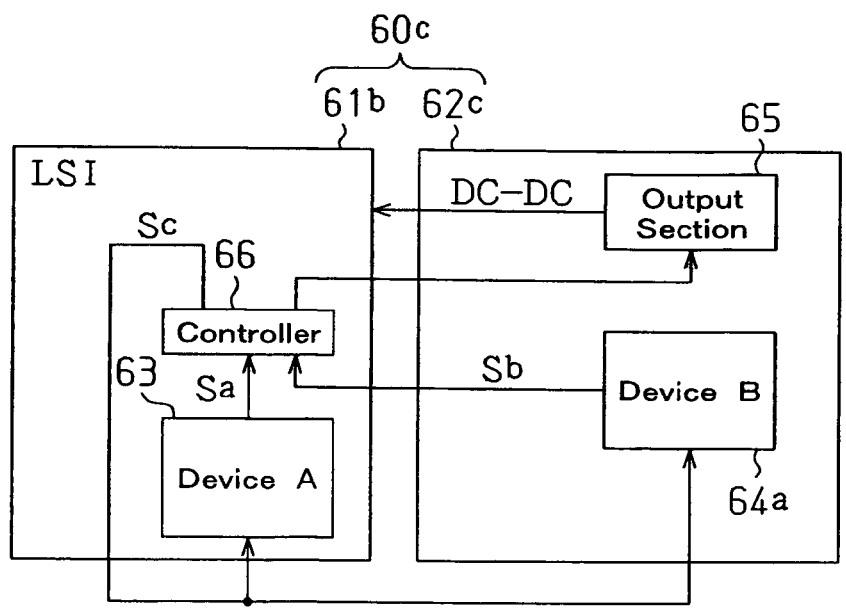
FIG. 6 is a schematic block diagram of a fourth modification of the semiconductor integrated circuit device.

Referring to FIG. 6, a semiconductor integrated circuit device 60c includes a semiconductor circuit (LSI) 61b and a DC-DC converter 62c. The DC-DC converter 62c includes a signal generation circuit (device B) 64a. The signal generation circuit 64a is selectively operated in response to a control signal Sc from the controller 66. Due to this configuration, the signal generation circuit 64a stops operating when monitoring is not being performed. This prevents an increase in the power consumption of the DC-DC converter 62c.

Figure 7:
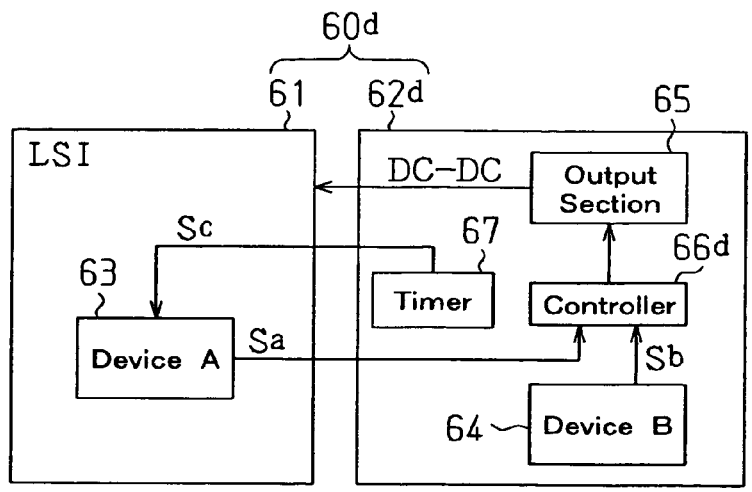
FIG. 7 is a schematic block diagram of a fifth modification of the semiconductor integrated circuit device.

Referring to FIG. 7, a semiconductor integrated circuit device 60d includes a semiconductor circuit (LSI) 61 and a DC-DC converter 62d. The DC-DC converter 62d includes a signal generation circuit (device B) 64, an output section (output circuit) 65, a controller 66d, and a timer circuit 67. The timer circuit 67 intermittently provides the monitor circuit (device A) 63 with a high control signal Sc. Due to this configuration, chronological changes of the semiconductor circuit 61 are coped with by periodically monitoring the condition of the semiconductor circuit 61 and controlling the output voltage Vo. In FIG. 7, the controller 66d functions as a first control section (first control circuit), and the timer circuit 67 functions as a second control section (second control circuit).

Figure 8:
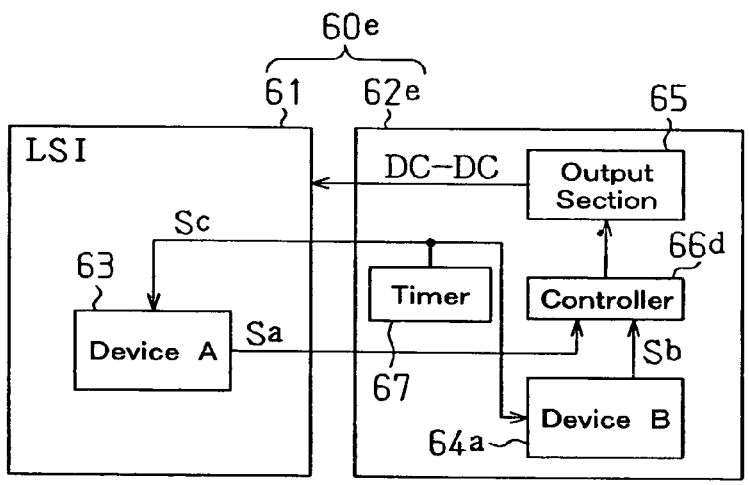
FIG. 8 is a schematic block diagram of a sixth modification of the semiconductor integrated circuit device.

Referring to FIG. 8, a semiconductor integrated circuit device 60e controls a signal generation circuit (device B) 64a with a control signal Sc provided from a timer circuit 67. In this configuration, the signal generation circuit 64a stops operating when monitoring is not being performed. This prevents an increase in the power consumption of the DC-DC converter 62a.

Figure 9:
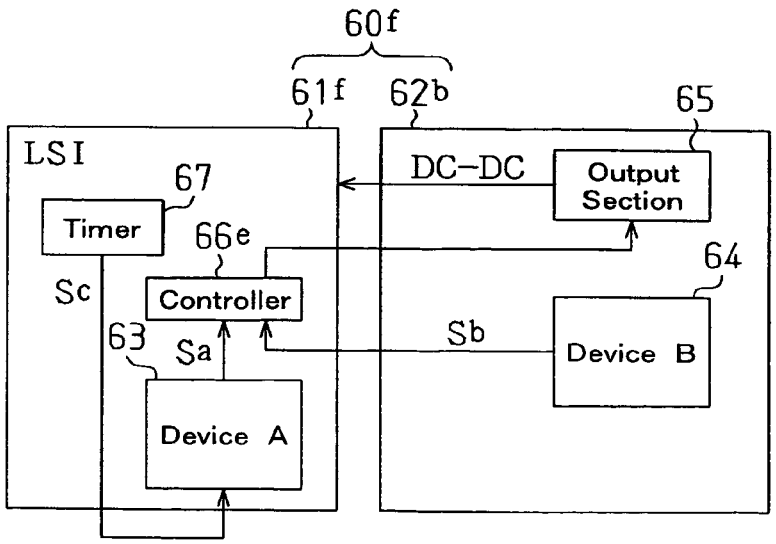
FIG. 9 is a schematic block diagram of a seventh modification of the semiconductor integrated circuit device.

Referring to FIG. 9, a semiconductor integrated circuit device 60f includes a semiconductor circuit (LSI) 61f and a DC-DC converter 62b. The semiconductor circuit 61f includes a monitor circuit (device A) 63, a controller 66e, and a timer circuit 67. The DC-DC converter 62b includes a signal generation circuit (device B) 64 and an output section (output circuit) 65. In this configuration, the output voltage Vo is controlled in accordance with the condition of the semiconductor circuit 61f to keep the operation speed of the semiconductor circuit 61f constant and cope with chronological changes of the semiconductor circuit 61f.

Figure 10:
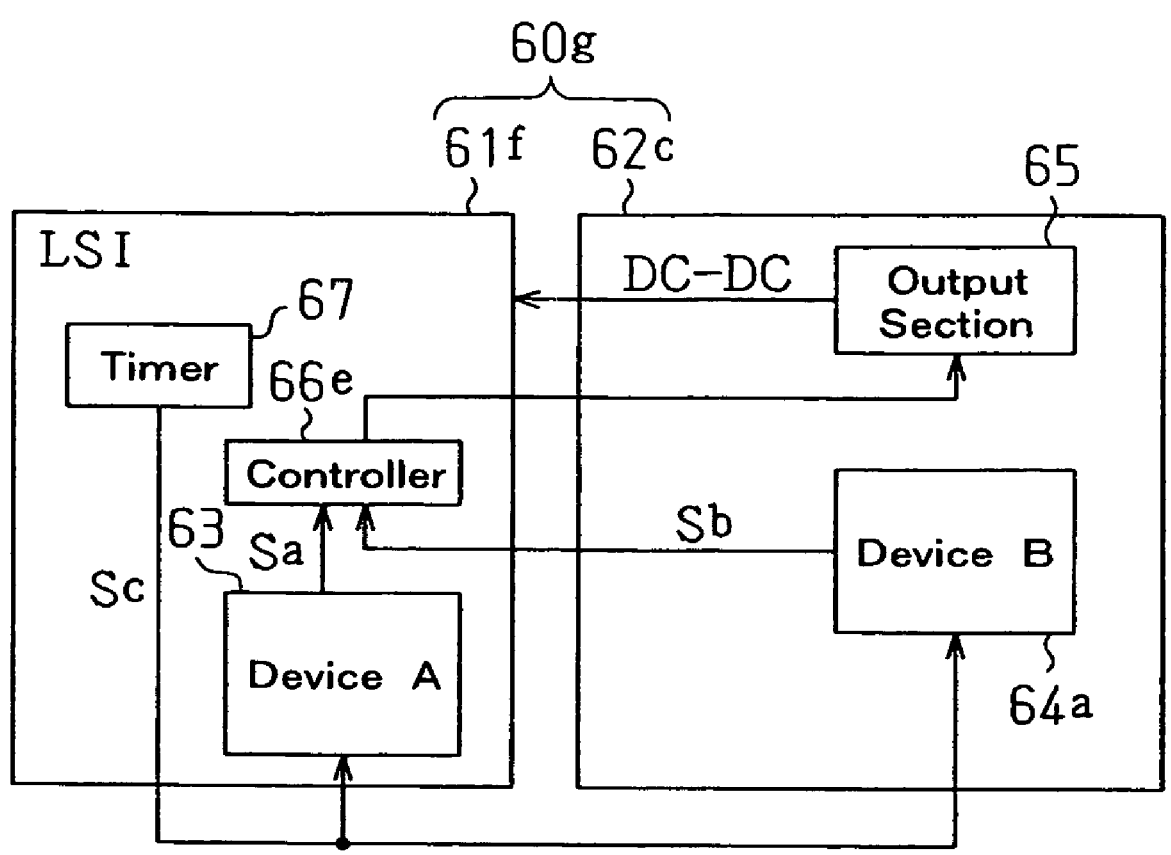
FIG. 10 is a schematic block diagram of an eighth modification of the semiconductor integrated circuit device.

Referring to FIG. 10, a semiconductor integrated circuit device 60g includes a semiconductor circuit (LSI) 61f and a DC-DC converter 62c. The semiconductor circuit 61f includes a monitor circuit (device A) 63, a controller 66e, and a timer circuit 67. The DC-DC converter 62c includes a signal generation circuit (device B) 64a and an output section (output circuit) 65. In this configuration, the output voltage Vo is controlled in accordance with the condition of the semiconductor circuit 61f to keep the operation speed of the semiconductor circuit 61f constant and cope with chronological changes of the semiconductor circuit 61f. Further, the signal generation circuit 64a stops operating when monitoring is not being performed. This prevents an increase in the power consumption of the DC-DC converter 62c.

In FIGS. 7 to 10, the controller 66 and the timer circuit 67 may be arranged in two separate circuits. More specifically, the timer circuit 67 may be arranged in the semiconductor circuit 61 in FIGS. 7 and 8, and the timer circuit 67 may be arranged in the DC-DC converters 62b and 62c in FIGS. 9 and 10.

The semiconductor circuit device may be configured by a plurality of chips. In such a case, it is preferred that the chip of the DC-DC converter 12 be configured so that the register 43 is rewritable. In this case, the output voltage Vo may be changed by changing the reference voltage value stored in the register 43 from an external device. Further, semiconductor circuits operated at different power supply voltages may be easily coped with.

Figure 11:
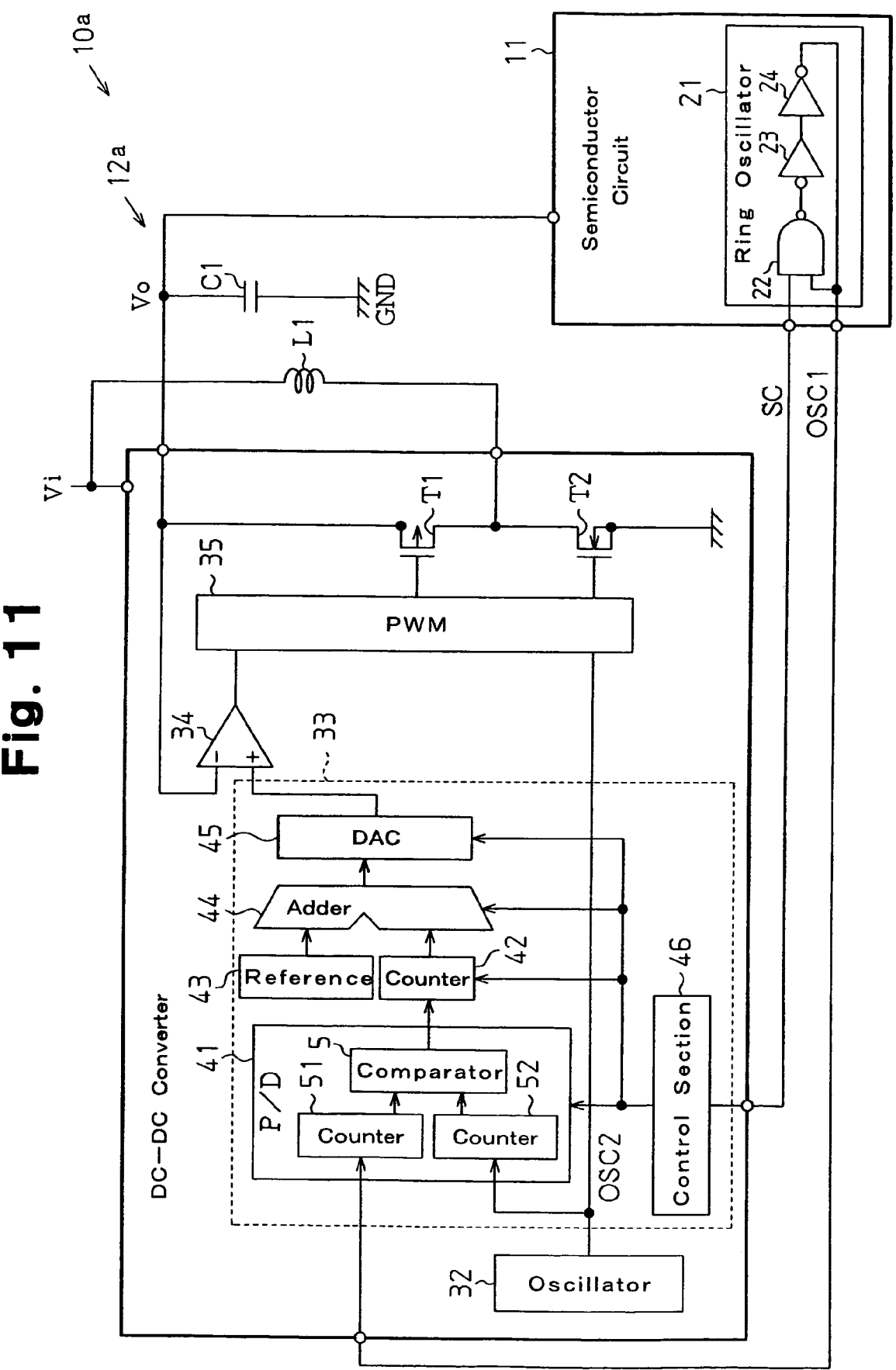
FIG. 11 is a schematic block diagram of a ninth modification of the semiconductor integrated circuit device.

The present invention may be applied to a semiconductor integrated circuit device including a step-up type DC-DC converter that raises the input voltage Vi to generate the voltage Vo. For example, as shown in FIG. 11, a DC-DC converter 12a of a semiconductor integrated circuit device 10a includes a coil L1 connected to the input voltage Vi and a node between transistors T1 and T2 to generate the step-up voltage Vo of the input voltage Vi at the source of the first transistor T1. In the semiconductor integrated circuit device 10a, the voltage is adjusted based on the oscillation output signal of a ring oscillator 21 arranged in a semiconductor circuit 11. Further, the semiconductor circuit 11 is operated at a predetermined speed. The DC-DC converter is not limited to step-up or step-down type converters and may be a DC-DC converter that generates a negative voltage or a DC-DC converter that generates a plurality of different voltages in accordance with the configuration of the semiconductor circuit 11.

The present examples and embodiments are to be considered as illustrative and not restrictive, and the invention is not to be limited to the details given herein, but may be modified within the scope and equivalence of the appended claims.

What is claimed is:

1. A semiconductor integrated circuit comprising:
   a semiconductor circuit including a monitor circuit for generating a monitor signal representing a characteristic of the semiconductor circuit; and
   a power supply circuit, connected to the semiconductor circuit, for supplying the semiconductor circuit with operational voltage, the power supply circuit including:
   an output circuit for generating the operational voltage; and
   a signal generation circuit for generating a reference signal, either one of the semiconductor circuit and the power supply circuit including:
   a control circuit, connected to the monitor circuit and the signal generation circuit, for comparing the monitor signal and the reference signal to control the output circuit to change the operational voltage in accordance with the comparison result and to generate a control signal for selectively operating the monitor circuit.

2. The semiconductor integrated circuit according to claim 1, wherein the signal generation circuit receives the control signal from the control circuit and operates in response to the control signal.

3. A semiconductor integrated circuit comprising:
   a semiconductor circuit including a monitor circuit for generating a monitor signal representing a characteristic of the semiconductor circuit; and
   a power supply circuit, connected to the semiconductor circuit, for supplying the semiconductor circuit with operational voltage, the power supply circuit including:
   an output circuit for generating the operational voltage; and
   a signal generation circuit for generating a reference signal, either one of the semiconductor circuit and the power supply circuit including:
   a first control circuit, connected to the monitor circuit and the signal generation circuit, for comparing the monitor signal and the reference signal to control the output circuit to change the operational voltage in accordance with the comparison result; and
   a second control circuit, connected to the monitor circuit, for generating a control signal to intermittently operate the monitor circuit.

4. The semiconductor integrated circuit according to claim 3, wherein the signal generation circuit receives the control signal from the second control circuit and operates in response to the control signal.

5. A semiconductor circuit for operation with voltage supplied from a DC-DC converter having a reference signal, the semiconductor circuit comprising:
   a monitor circuit, operated in accordance with a control signal, for generating a monitor signal representing a characteristic of the semiconductor circuit; and
   a control circuit for connection to the DC-DC converter and connected to the monitor circuit, for comparing the reference signal of the DC-DC converter and the monitor signal of the monitor circuit to control the DC-DC converter to change the voltage in accordance with the comparison result and to generate the control signal for selectively operating the monitor circuit.

6. A semiconductor circuit for operation with voltage supplied from a DC-DC converter having a reference signal, the semiconductor circuit comprising:
   a monitor circuit, operated in accordance with a control signal, for generating a monitor signal representing a characteristic of the semiconductor circuit;
   a first control circuit for connection to the DC-DC converter and connected to the monitor circuit, for comparing the reference signal of the DC-DC converter and the monitor signal of the monitor circuit to control the DC-DC converter to change the voltage in accordance with the comparison result; and
   a second control circuit, connected to the monitor circuit, for generating the control signal to intermittently operate the monitor circuit.

7. A DC-DC converter for receiving input voltage and generating operational voltage for supply to a semiconductor circuit, wherein the semiconductor circuit includes a monitor circuit for generating a monitor signal representing a characteristic of the semiconductor circuit, the DC-DC converter comprising:
   a signal generation circuit for generating a reference signal; and
   a control circuit for connection to the monitor circuit and the signal generation circuit, comparing the monitor signal and the reference signal, controlling the operational voltage in accordance with the comparison result, and generating a control signal for selectively operating the monitor circuit.

8. The DC-DC converter according to claim 7, wherein the monitor circuit includes a ring oscillator for generating an oscillation signal as the monitor signal, the DC-DC converter further comprising:
   an error amplification circuit for amplifying the voltage difference between the operational voltage and a comparison voltage to generate an amplified signal;
   a PWM control circuit, connected to the error amplification circuit, for comparing the amplified signal and a triangular wave signal to generate first and second control signals each having a pulse width that is in accordance with the comparison result;
   a first transistor including a first gate for receiving the first control signal; and a second transistor connected in series to the first transistor and including a second gate for receiving the second control signal;

wherein the control circuit detects the phase difference between the oscillation signal of the ring oscillator and the reference signal to control the comparison voltage in accordance with the detection result.

9. The DC-DC converter according to claim 8, wherein the control circuit includes:
  a phase detector, connected to the ring oscillator, for detecting the phase difference between the oscillation signal and the reference signal to generate a phase difference detection signal;
  a counter, connected to the phase detector, for generating a count value by counting upward or downward in accordance with the phase difference detection signal;
  a register for storing a reference voltage value;
  an adder, connected to the counter and the register, for adding the count value of the counter to the reference voltage value to generate a sum signal; and
  a D-A converter, connected to the adder and the error amplification circuit, for generating the comparison voltage in accordance with the sum signal and supplying the comparison voltage to the error amplification circuit.

10. The DC-DC converter according to claim 9, wherein the phase detector includes:
  a first counter, connected to the ring oscillator, for counting the frequency of the oscillation signal to generate a first count value;
  a second counter for counting the frequency of the reference signal and generating a second count value; and
  a comparator, connected to the first and second counters, for comparing the first and second count values to generate the phase difference detection signal.

11. A DC-DC converter for receiving input voltage and generating operational voltage for supply to a semiconductor circuit, wherein the semiconductor circuit includes a monitor circuit for generating a monitor signal representing a characteristic of the semiconductor circuit, the DC-DC converter comprising:
  a signal generation circuit for generating a reference signal;
  a first control circuit for connection to the monitor circuit and the signal generation circuit and comparing the monitor signal and the reference signal to control the operational voltage in accordance with the comparison result; and
  a second control circuit for connection to the monitor circuit and generating a control signal to intermittently operate the monitor circuit.

12. The DC-DC converter according to claim 11, wherein the monitor circuit includes a ring oscillator for generating an oscillation signal as the monitor signal, the DC-DC converter further comprising:
  an error amplification circuit for amplifying the voltage difference between the operational voltage and a comparison voltage to generate an amplified signal;
  a PWM control circuit, connected to the error amplification circuit, for comparing the amplified signal and a triangular wave signal to generate first and second control signals each having a pulse width that is in accordance with the comparison result;
  a first transistor including a first gate for receiving the first control signal; and
  a second transistor connected in series to the first transistor and including a second gate for receiving the second control signal, the operational voltage being generated by activating and inactivating the first and second transistors;

wherein the first control circuit detects a phase difference between the oscillation signal of the ring oscillator and the reference signal to control the comparison voltage in accordance with the detection result.

13. The DC-DC converter according to claim 12, wherein the first control circuit includes:
  a phase detector, connected to the ring oscillator, for detecting the phase difference between the oscillation signal and the reference signal to generate a phase difference detection signal;
  a counter, connected to the phase detector, for generating a count value by counting upward or downward in accordance with the phase difference detection signal;
  a register for storing a reference voltage value;
  an adder, connected to the counter and the register, for adding the count value of the counter to the reference voltage value to generate a sum signal; and
  a D-A converter, connected to the adder and the error amplification circuit, for generating the comparison voltage in accordance with the sum signal and supplying the comparison voltage to the error amplification circuit.

14. The DC-DC converter according to claim 13, wherein the phase detector includes:
  a first counter, connected to the ring oscillator, for determining the frequency of the oscillation signal and generating a first count value;
  a second counter for determining the frequency of the reference signal and generating a second count value; and
  a comparator, connected to the first and second counters, for comparing the first and second count values to generate the phase difference detection signal.

15. A circuit for controlling a DC-DC converter for receiving input voltage and generating operational voltage for supply to a semiconductor circuit, wherein the semiconductor circuit includes a monitor circuit for generating a monitor signal representing a characteristic of the semiconductor circuit, the circuit comprising:
  a signal generation circuit for generating a reference signal; and
  a control circuit, connected to the monitor circuit and the signal generation circuit, for comparing the monitor signal and the reference signal, controlling the DC-DC converter to change the operational voltage in accordance with the comparison result, and generating a control signal for selectively operating the monitor circuit.

16. The circuit according to claim 15, wherein the monitor circuit includes a ring oscillator for generating an oscillation signal as the monitor signal, and the DC-DC converter includes:
  an error amplification circuit for amplifying the voltage difference between the operational voltage and a comparison voltage to generate an amplified signal;
  a PWM control circuit, connected to the error amplification circuit, for comparing the amplified signal and a triangular wave signal to generate first and second control signals having a pulse width that is in accordance with the comparison result;
  a first transistor including a first gate for receiving the first control signal; and
  a second transistor connected in series to the first transistor and including a second gate for receiving the second control signal, the operational voltage being generated by activating and inactivating the first and second transistors;

wherein the control circuit detects a phase difference between the oscillation signal of the ring oscillator and the reference signal to control the comparison voltage in accordance with the detection result.

17. A method for controlling a DC-DC converter that receives input voltage and generates operational voltage supplied to a semiconductor circuit, the semiconductor circuit including a monitor circuit for generating a monitor signal representing a characteristic of the semiconductor circuit, the method comprising:

generating a reference signal;

comparing the monitor signal and the reference signal to control the DC-DC converter to change the operational voltage in accordance with the comparison result; and stopping the operation of the monitor circuit with a control signal.

18. The method according to claim 17, wherein the monitor circuit includes a ring oscillator for generating an oscillation signal as the monitor signal, and the DC-DC converter includes:

an error amplification circuit for amplifying the voltage difference between the operational voltage and a comparison voltage to generate an amplified signal;

a PWM control circuit, connected to the error amplification circuit, for comparing the amplified signal and a triangular wave signal to generate first and second control signals having a pulse width that is in accordance with the comparison result;

a first transistor including a first gate for receiving the first control signal; and a second transistor connected in series to the first transistor and including a second gate for receiving the second control signal, the operational voltage being generated by activating and inactivating the first and second transistors;

wherein said comparing includes:

detecting the phase difference between the oscillation signal and the reference signal; and controlling the comparison voltage in accordance with the detection result.

19. A method for controlling a DC-DC converter that receives input voltage and generates operational voltage supplied to a semiconductor circuit, the semiconductor circuit including a monitor circuit for generating a monitor signal representing a characteristic of the semiconductor circuit, the method comprising:

intermittently operating the monitor circuit with a control signal;

generating a reference signal; and comparing the monitor signal and the reference signal to control the DC-DC converter to change the operational voltage in accordance with the comparison result.

20. The method according to claim 19, wherein the monitor circuit includes a ring oscillator for generating an oscillation signal as the monitor signal, and the DC-DC converter includes:

an error amplification circuit for amplifying the voltage difference between the operational voltage and a comparison voltage to generate an amplified signal;

a PWM control circuit, connected to the error amplification circuit, for comparing the amplified signal and a triangular wave signal to generate first and second control signals each having a pulse width that is in accordance with the comparison result;

a first transistor including a first gate for receiving the first control signal; and a second transistor connected in series to the first transistor and including a second gate for receiving the second control signal, the operational voltage being generated by activating and inactivating the first and second transistors;

wherein said comparing includes:

detecting a phase difference between the oscillation signal and the reference signal; and controlling the comparison voltage in accordance with the detection result.

* * * * *